April 22, 1958     W. C. HARMON     2,832,040
DIRECT READING SEAM DEPTH INDICATOR
Filed Dec. 7, 1954     3 Sheets-Sheet 1
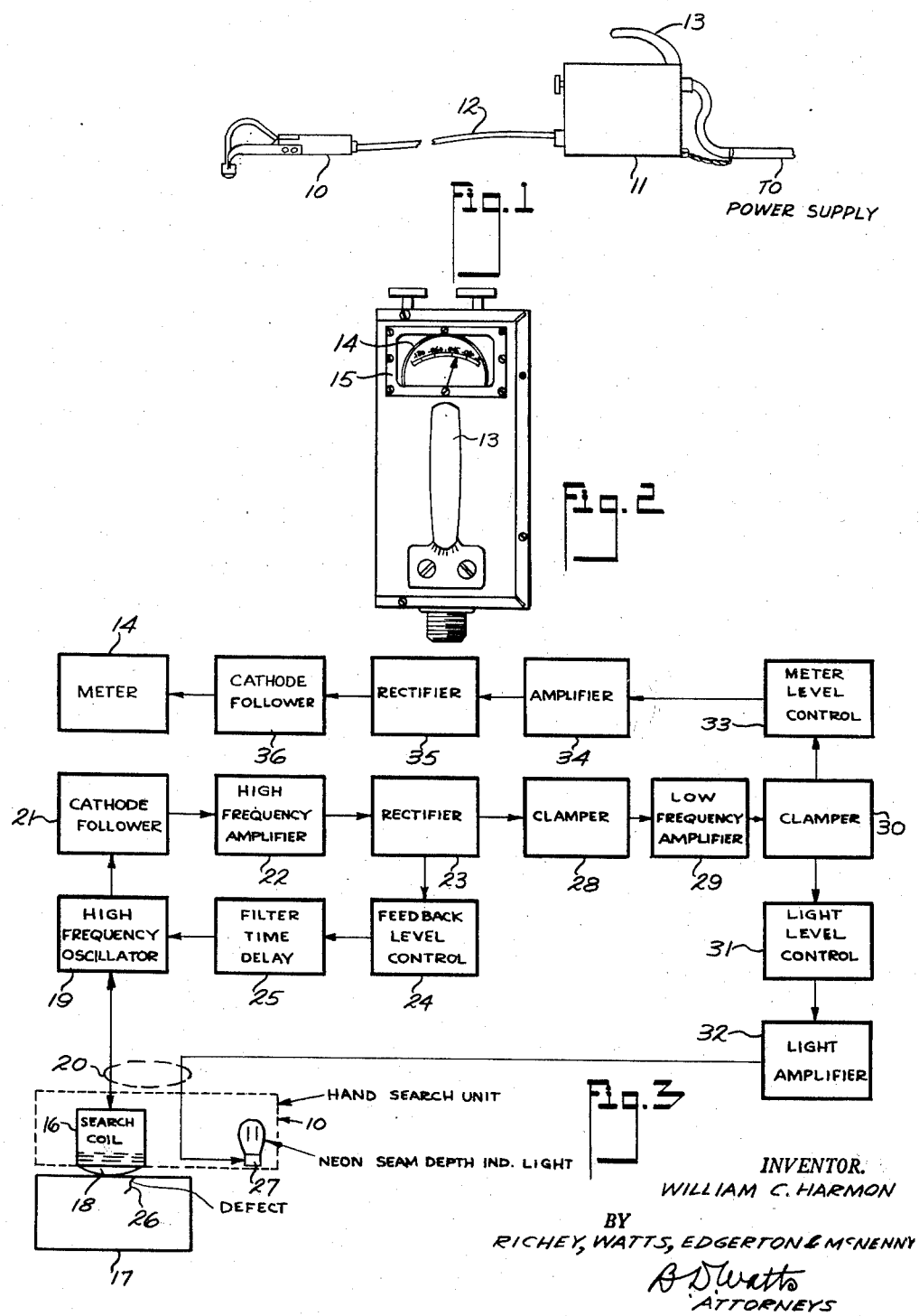
INVENTOR.
WILLIAM C. HARMON
BY
RICHEY, WATTS, EDGERTON & McNENNY
B.D.Watts
ATTORNEYS

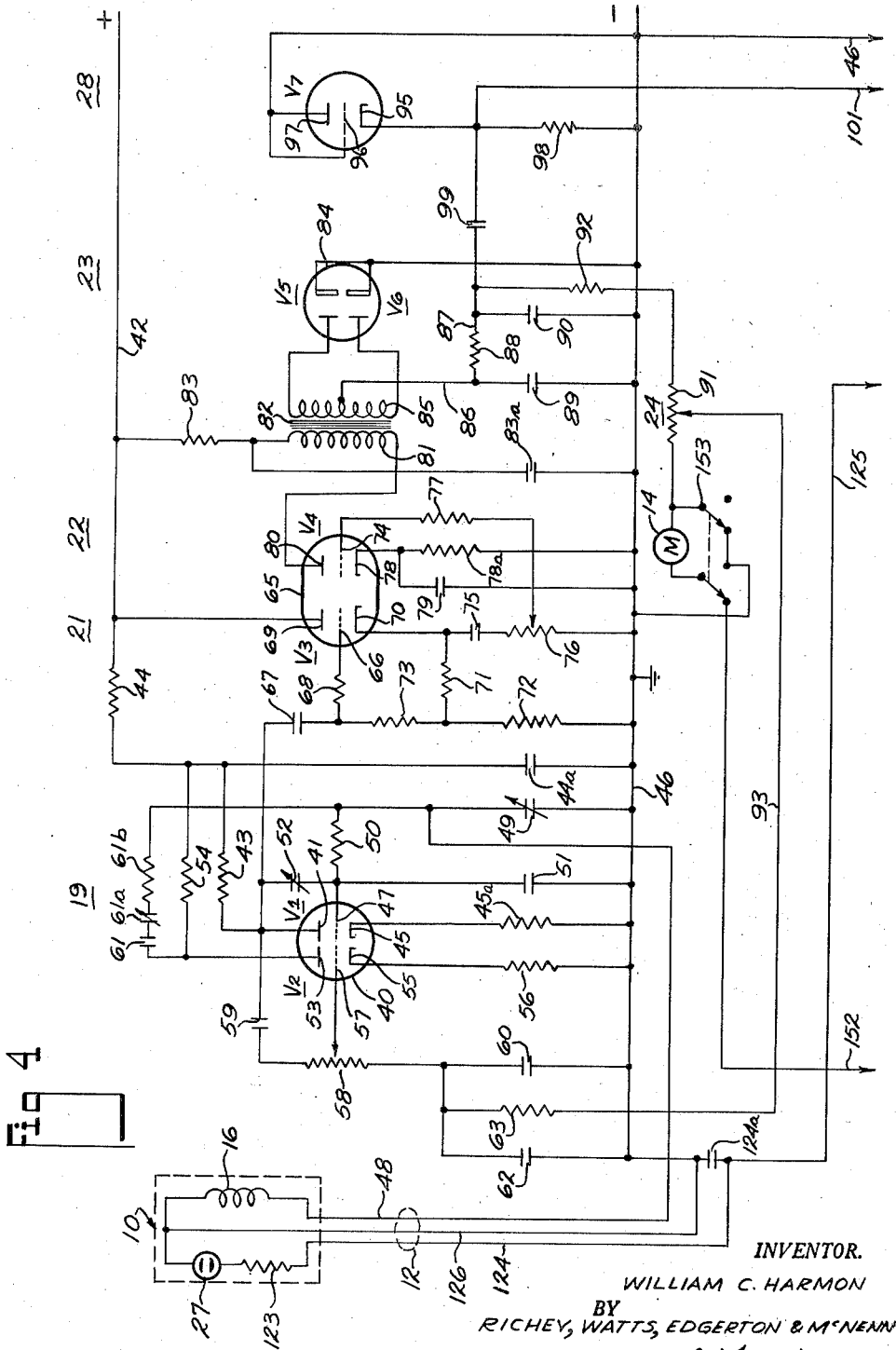

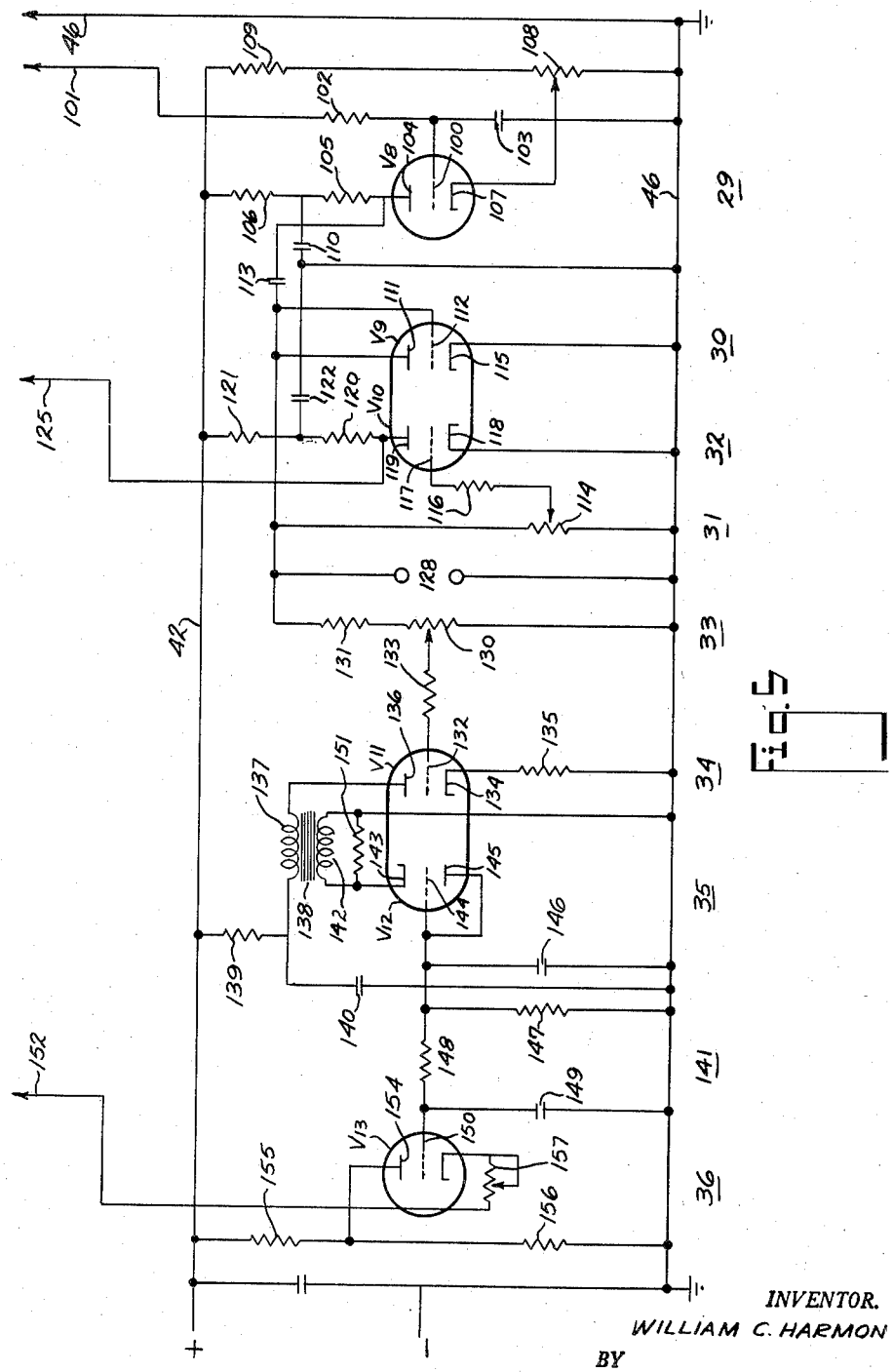

United States Patent Office 2,832,040
Patented Apr. 22, 1958

2,832,040

DIRECT READING SEAM DEPTH INDICATOR

William C. Harmon, Chagrin Falls, Ohio, assignor to Republic Steel Corporation, Cleveland, Ohio, a corporation of New Jersey Application December 7, 1954, Serial No. 473,718

7 Claims. (Cl. 324—34)

This invention relates to flaw detectors for metallic work pieces and, more particularly, to apparatus for directly indicating the depth of seams in steel billets.

An object of the invention is to test metallic work pieces by means of high frequency electrical currents in order to detect defects and flaws adjacent the surface of the pieces.

Another object of the invention is to test steel billets and the like for breaks, slivers, seams, laps and the like from the surface of the piece to indicate the depth of such breaks, slivers, seams and laps below the surface on which the test is being conducted.

Still another object of the invention is to reduce the time necessary to locate a flawed area adjacent the surface of a steel billet or other metallic or non-metallic work piece.

In U. S. Patent No. 2,660,704, issued November 24, 1953, to William C. Harmon, and entitled "Seam Depth Indicator," there is described a testing apparatus for locating flaws such as cracks, seams, laps, breaks, and slivers in steel billets by measurements conducted at the surface of the billet. The apparatus therein described includes a search unit adapted to be positioned upon or adjacent to the billet for subjecting the billet to an electromagnetic field generated by a coil carried in the search unit. The search unit is energized by an oscillator carried in a portable unit and connected to the search unit through a cable. Suitable amplifying and control means are incorporated in the remote unit which convert the signal variations produced at the search unit by reason of the variations in the nature of the work piece into changes in the energizing voltage applied to a neon indicating lamp carried in the search unit. Flaws of greater than a predetermined depth or extent produce a sufficient increase in the energizing voltage to light the indicating lamp and thus provide an indication of the presence of the flaw or other defect. Copending application, Serial No. 306,445, filed August 26, 1952, now abandoned, describes an improved apparatus and method for locating flaws of the type referred to.

The apparatus just referred to has been particularly successful in accomplishing its intended purpose, but I have found that, under certain circumstances, the practice of the invention described in the patent may be greatly facilitated by reason of a further discovery that the magnitude of the output voltage produced by the apparatus as a result of the variations in signal strength produced by the flaws in the billet bears a substantially constant relation to the depth of the flaw in the steel billet.

Accordingly, I have devised and describe herein an arrangement which includes an electrical meter mounted in the portable unit referred to above, and suitable circuits for operating the meter to provide a direct indication of the depth of the seam or other flaw in the billet.

The present invention effects an important improvement in the results obtained by the practice of the invention of the aforesaid patent. This is particularly so where seams, cracks or laps extend for a substantial distance along the billet or define a generally flawed area whose bounds must be located by the operator in order that he may reach a decision as to whether the piece shall be passed or rejected. By the use of the present device, an extended flaw may be followed directly rather than requiring the repeated passes with different adjustments for different depths required with the neon indicating device with a consequent substantial reduction in the amount of time necessary for inspecting a billet.

It is a feature also of the apparatus disclosed and described herein that the entire circuitry has been revised and simplified so that the entire electrical apparatus is contained in the search unit and the portable unit, and that the bulky remote unit of the earlier device is eliminated.

The features of the invention are pointed out with particularity in the appended claims. The invention together with objects and advantages thereof may be better understood by reference to the following detailed description taken in connection with the accompanying drawings, in which:

Fig. 1 is an elevation view of the search unit and portable unit of the detector;

Fig. 2 is a top view of the portable unit illustrating particularly the arrangement of the depth indicating meter;

Fig. 3 is a schematic representation of the electrical circuit of the apparatus; and Figs. 4 and 5 constitute a schematic diagram of the electrical circuit of the apparatus.

Referring now to Figs. 1 and 2, the search unit 10 constitutes a device adapted to be carried by an operator and brought into contact with the billet or work piece which is to be tested, as set forth in the patent referred to above. The search unit 10 is connected to and energized from a portable unit 11 by means of a cable 12. The portable unit 11 is adapted to be carried by the operator and includes a handle 13 whereby the portable unit may be held in one hand, while the search unit 10 is held in the remaining hand for traversing the work piece. In accordance with the present invention, a meter 14 is mounted beneath a window 15 in the top panel of the portable unit 11 so that the operator may observe the meter reading for a direct indication of the depth of the flaw as the search unit 10 is moved over the work piece.

Referring now to Fig. 3, the search unit 10 includes a search coil 16 which may be brought into proximity with the work piece 17 and maintained at a fixed distance from the surface of the piece by a sapphire shoe 18. The search coil is connected to a high frequency oscillator 19 by means of a cable 20 and constitutes a primary frequency determining element for the oscillator 19 as set forth in my copending application, Serial No. 306,445, referred to above. The oscillator 19 includes two separate stages, an amplifying stage and a feedback stage so that separate control of the feedback may be had, as set forth below.

The high frequency alternating voltages generated by the oscillator 19 are transmitted to a cathode follower 21 and thence to a high frequency amplifier 22. The alternating voltages at the output of the amplifier are detected by means of a rectifier 23 and the rectified voltages at the output of the rectifier are returned to the oscillator 19 through a feedback level control 24 and a filter 25. The rectified voltages are utilized to bias the feedback stage of the oscillator in order to maintain the amplitude level of the oscillations substantially constant except for the changes produced when a flaw such as the seam 26 is encountered in moving the search coil 10 over the surface of the work piece 17. The filter 25 functions as an integrating device so that only voltage impulses of greater than a predetermined duration are imparted to the oscillator 19 while the feedback level control 24 functions as a means for controlling the amplitude of the feedback voltages.

The rectified or demodulated voltages at the output of the rectifier 23 contain only the changes attributable to the changes in oscillation amplitude produced as the search coil 16 is passed over the seam 26. These changes are denoted as low frequency changes and the low frequency voltages at the output of the rectifier 23 are employed to actuate the meter 14 and a neon lamp 27 in the search unit 10. To this end, the low frequency voltages at the output of the rectifier 23 are passed through a clamper 28 which establishes a reference level, a low frequency amplifier 29 and a second clamper 30 for establishing a new reference for the amplified signals.

The low frequency voltages at the output of the clamper 30 are passed through a light level control 31 and a light amplifier 32 to the neon lamp 27 which glows when the low frequency voltages from the amplifier 32 exceed a predetermined amplitude. The level control 31 is calibrated so that the neon lamp 27 may be made to glow for different seam depths.

The low frequency output from the clamper 30 is passed also through a meter level control 33, an amplifier 34, a rectifier 35 and a cathode follower 36 to the meter 14. The meter level control 33 is adjusted to calibrate the meter 14 so that the meter reading corresponds to the depth of the seam.

Referring now to the schematic diagram of Figs. 4 and 5, the oscillator 19 comprises a tube 40 including two vacuum triodes V1 and V2 and certain associated circuitry. The triode V1 forms a part of the amplifier stage of the oscillator referred to above. The triode V1 has an anode 41 connected to a positive plate voltage lead 42 through a plate resistor 43 and a decoupling resistor 44 and bypassed by a decoupling capacitor 44a. The cathode 45 is connected to a negative plate voltage and ground lead 46 through a cathode dropping resistor 45a.

The search coil 16 is connected to the grid electrode 47 of the triode V1 by a lead 48 of the cable 12 and forms with the capacitor 49 an oscillating tank circuit for the oscillator. The coil 16 and the capacitor 49 are connected to the grid electrode 47 through a grid resistor 50 while the grid electrode is connected to the ground lead through a capacitor 51 and to the anode 41 by a capacitor 52.

The tube V2 comprises the feedback stage of the oscillator referred to above and has an anode 53 connected to the positive plate voltage lead 42 through a plate resistor 54 and the decoupling resistor 44 and a cathode 55 connected to the negative lead 46 through a cathode resistor 56. The grid electrode 57 of the triode V2 is connected to a potentiometer 58 which is connected in a series circuit including the capacitors 59 and 60 from the anode 41 of triode V1 to the negative lead 46. The output of the feedback stage is coupled to the grid electrode 47 of the triode V1 by means of capacitors 61 and 61a and resistor 61b, connected in a series circuit from the anode 53 of triode V2 to the junction of the grid resistor 50 and capacitor 49 and search coil 16. A capacitor 62 and resistor 63 are connected in the grid circuit of the triode V2 and serve as an integrating or filter circuit to discriminate between different bias voltage variations, as will be subsequently described.

In operation, the voltage changes in the plate circuit of triode V1 are impressed upon the grid circuit of triode V2 through the coupling capacitor 59 to produce plate voltage changes at the anode of triode V2. These changes are then impressed upon the grid circuit of triode V1 through capacitors 61 and 61a and resistor 61b so that the triodes V1 and V2 form an oscillating circuit having the search coil 16 as a frequency determining element. The grid bias for the triode V2 is developed between the potentiometer 58 and the lead 46 and the adjustment of the potentiometer 58 determines the amount of excitation of the triode V2 and hence the initial amplitude of the oscillations generated by the oscillator 19. The size of the search coil 16 and the capacitor 49 should preferably be such that the oscillator 19 oscillates at a frequency such that the reaction of the work piece upon the coil 16 as the search unit 10 is moved toward and away from the work piece does not substantially change the amplitude of the oscillations. Additionally, the capacitor 61a may, in certain circumstances, be adjusted to control the phase of the feedback voltage relative to the voltage of grid electrode 47 and the anode 53 to further reduce the change in oscillator amplitude produced by the reaction of the work piece. Adjustment of capacitor 49 is usually sufficient to prevent amplitude changes due to the approach of the search coil to the work piece when inspecting carbon steels. However, when inspecting alloy steels, adjustment of capacitor 61a will usually be necessary.

The cathode follower 21 includes the triode V3 of tube 65 which has its grid electrode 66 coupled to the anode 41 of triode V1 through a coupling capacitor 67 and a series grid resistor 68. The anode 69 of triode V3 is connected directly to the positive lead 42 while the cathode 70 is connected to the negative lead 46 through the cathode coupling resistors 71 and 72. A grid resistor 73 is connected between the grid coupling circuit of triode V3 and the junction of the cathode resistors 71 and 72 to provide a bias voltage for the grid electrode 66.

The high frequency amplifier 22 includes a triode V4 of tube 65 which has the grid electrode 74 connected to the cathode circuit of triode V3 through a coupling network which includes a coupling capacitor 75, a potentiometer 76 and a series grid resistor 77. The cathode 78 is connected to the negative lead 46 through a cathode resistor 78a and a bypass capacitor 79 to provide a cathode bias, while the anode 80 is connected to the positive lead 42 through the primary 81 of a coupling transformer 82 and a decoupling resistor 83; a decoupling capacitor 83a is connected to the juncture of primary 82 and the resistor 83 and to the negative lead 46. The signal amplitude at the input of the amplifier 22 is determined by the adjustment of the potentiometer 76.

The output of the high frequency amplifier 22 is rectifier or demodulated by the rectifier 23 which includes two vacuum diodes V5 and V6 of the tube 84. The diodes V5 and V6 are connected to the secondary 85 of the transformer 82 in a full-wave rectification circuit with the cathodes of the diodes connected to the negative lead 46 so that the rectified output voltages appear at the lead 86 from the center tap of the winding 85. The rectified voltages pass through a filter 87, including a resistor 88 and two capacitors 89 and 90, which eliminates the oscillation frequency component to produce an output voltage whose amplitude corresponds to the variation in amplitude level of the oscillations.

The voltages developed at the output of the filter 87 are utilized for two purposes: first, to control the amplitude level of oscillation of the oscillator 19; and, secondly, to provide an indication of the presence of flaws in the work piece. In accordance with the teachings of the patent and the application referred to above, a feedback level control potentiometer 91 and a series resistor 92 are connected across the output of the filter 87 and the adjustable tap of the potentiometer 91 is connected to the grid resistor 63 by means of lead 93. The voltages developed across the output of the filter 87 are thus impressed upon the grid circuit of the triode V2 to develop a bias upon the grid electrode 57. The time constant of the circuit, which includes the capacitors 60 and 62 and the resistor 63 as the primary time constant determining elements, is such that changes in level of amplitude of oscillation of relatively short duration, such as might be caused by passing the search coil over the seam 26 do not produce any changes in grid bias voltage. Other changes of relatively longer duration modify the grid bias voltage so as to maintain the oscillation amplitude substantially constant. The initial amplitude of oscillation is determined by the amount of excitation upon the grid electrode and is controlled by adjustment of the potentiometer 58, as set forth above.

The voltages at the output of the filter 87 are utilized also to provide an indication of the presence of flaws in the work piece and are amplified by the low frequency amplifier 29. The output of the filter 87 is coupled to the cathode 95 of the triode V7 which functions as the clamper 28. The grid electrode 96 and anode 97 are connected together and to the lead 46 so that the triode V7 operates as a diode and the low frequency signals are impressed across a cathode resistor 98 by means of a coupling capacitor 99. The clamper shunts the negative impulses so that only positive impulses may appear across the cathode resistor 98, thereby establishing a reference voltage level for the low frequency signals.

The positive impulses across the cathode resistor 98 are amplified by the low frequency amplifier 29 which includes the triode V8. The cathode of tube V7 is connected to the grid electrode 100 of triode V8 by a lead 101 and a resistor 102 which forms with the capacitor 103 a low pass filter in the grid circuit for the triode V8. The anode 104 of the triode V8 is connected to the positive high voltage lead 42 through plate resistor 105 and decoupling resistor 106 while the cathode 107 is connected to the potentiometer 108 which forms a bias voltage dividing network from the positive lead 42 to the negative and ground lead 46 with the resistor 109. A decoupling capacitor 110 is connected from the juncture of the resistors 105 and 106 to the negative lead 46.

The output of the low frequency amplifier 29 is passed to the clamper 30 which includes the triode V9 connected as a diode rectifier. The anode 111 and grid electrode 112 of tube V9 are connected to the coupling capacitor 113 which forms, with a potentiometer 114, a series circuit from the anode 104 of triode V8 to the negative lead 46. The cathode 115 of triode V9 is connected to the negative lead 46 so that only negative impulses may appear across the potentiometer 114.

The potentiometer 114 constitutes the light level control 31 of Fig. 2 and controls the amplitude of the low frequency signal impulses which are impressed upon the light amplifier 32. To this end, the potentiometer 114 is connected through the series grid resistor 116 to the grid electrode 117 of triode V10. The triode V10 is connected in the usual amplifying circuit and has the cathode 118 connected to the negative lead 46 and the anode 119 connected to the positive lead through plate resistors 120 and decoupling resistor 121. A decoupling capacitor 122 is connected to the juncture of resistors 120 and 121 and to the negative lead 46.

The output of the light amplifier 32 is utilized to excite the neon lamp 27 in the search unit 10. To this end, the neon lamp 27 is connected to the anode 119 of triode V10 through the dropping resistor 123 and the lead 124 of cable 12 and lead 125 within the portable unit. The neon lamp 27 is connected to the negative lead 46 by means of the lead 126 of cable 12 which may constitute a shield for the cable. A bypass capacitor 124a is connected between lead 124 and negative lead 46 to prevent undesirable feedback effects through the conductor 125. In operation, the negative going impulses impressed upon the grid electrode 117 of the triode V10 produces a corresponding increase in the voltage at the anode 119 of that tube. This increase in amplitude is imparted to the neon lamp 127 which, when the voltage across the lamp exceeds the critical potential of the lamp, causes the lamp to fire and provide an indication of the presence of the seam or other flaw in the work piece. The potentiometer 114 is adjusted by the operator of the detector so that the neon lamp 27 will only be fired when flaws of greater than a predetermined depth are traversed by the search coil 16. That is, when the changes in oscillation amplitude produced by a flaw are greater than the amount necessary to produce an increase in voltage at the anode 119 sufficient to fire the neon lamp 27, the neon lamp will indicate the presence of the flaw.

Two terminals 128 are provided for connecting a recorder to the output of the clamper 30.

The negative going impulses at the output of the clamper 30 are utilized also to actuate the meter 14 which provides a direct indication of the depth of the seam or other flaw. To this end, a potentiometer 130, which comprises the meter level control 33 of Fig. 2, is connected with a series resistor 131 from the capacitor 113 and the electrodes 111 and 112 of triode V9 to the negative lead 46. The impulses are thus impressed upon the grid electrode 132 of triode V11 through the potentiometer 130 and a series grid resistor 133. The triode V11 serves as a meter amplifier and has the cathode 134 thereof connected to the negative lead through the cathode resistor 135 and the anode 136 connected to the positive lead 42 through the primary 137 of a plate transformer 138 and the decoupling resistor 139. The decoupling capacitor 140 is connected from the resistor 139 and the winding 137 to the negative lead 46.

The output of the transformer 138 is rectified by a triode V12, connected as a diode, and transmitted to the cathode follower 36 through a filter 141. The secondary 142 of the transformer 138 is connected to the negative lead 46 and to the cathode 143 of triode V12, which has the grid electrode 144 and anode 145 connected to a relatively large capacitor 146. The filter 141, which comprises the resistors 147 and 148 and capacitor 149 is connected between the capacitor 146 and the control electrode 150 of triode V13. The time constant of the capacitor 146 and the resistor 147 is very large so that a bias potential for the control electrode 150 is built up across the capacitor 146 when the search coil is passed across the work piece. The constants of the filter 141 are such as to eliminate any relatively rapid changes in the bias potential applied to the control electrode 150. A resistor 151 is connected across the secondary winding 142 of transformer 138 to eliminate the tendency toward self-oscillation due to shock excitation by the impulses from the amplifier 34.

The meter 14 is connected in the cathode circuit of the triode V13 by means of the lead 152 and a switch 153, the latter connecting the meter 14 from the lead 152 to the negative lead 46. The anode 154 is connected to a voltage divider including two resistors 155 and 156 connected from the positive lead 42 to the negative lead 46. The voltage at the juncture of resistors 155 and 156 is such that the cathode current actuates the meter to a full scale reading and the negative bias impressed upon the control electrode 150 by the negative voltage from the capacitor 146 cause the current to decrease and the meter needle to move toward the zero reading. The amplitude of the negative impulses from the secondary of the transformer thus determines the bias voltage developed across the capacitor 146 and hence the reading of the meter 14.

A potentiometer 157 connected in the cathode circuit with the meter 14 is provided to adjust the cathode current to a full scale reading prior to utilizing the instrument.

The switch 153 serves also during the initial adjustment of the detector to adjust the amplitude of the oscillations of the oscillator 19. In the position of the switch 153 shown in Fig. 4, the meter is connected in the cathode circuit of the cathode follower 36. In the alternate position, however, the meter is connected in series with the potentiometer 91 and the resistor 92 across the output of the filter 87. In this position, the meter reads the average value of the rectified current at the output of the rectifier 23 and may be set to a predetermined value by the potentiometer 58 with the search unit 10 in some position away from the work piece.

The power supply for the apparatus just described may be of a conventional type incorporating electronic voltage regulation. Such regulation is essential in order that the circuits operate with the necessary stability.

The term "high frequency," as used here to denote voltage or current changes or signal frequencies, is intended to refer to the frequency of the signal or carrier generated by the oscillator 19. The changes in the amplitude of the signals generated by the oscillator 19 which are produced by passing the search coil over the flawed portion of a billet are, by way of distinction, denoted as low frequency changes or signals. The terms "high frequency" and "low frequency" are also to be distinguished from the very low frequency or very slow changes which are produced by thermal effects, aging of components, etc.

The flaw detector described herein is by no means limited to use for testing steel billets. It may be advantageously used for detecting and measuring the depth of seams in pipe couplings, bar mill rolls, mine hoists, brake drums, seamless tubing and the like; for inspecting the interior surface of steel boilers and other vessels which are subjected to high pressures for inspecting pipe skelp for surface cracks and for detecting and measuring the depth of quench cracks in steels bars.

It is to be understood that the specific nature of the present disclosure is not intended to be restrictive or confining, but that various rearrangements of the apparatus may be resorted to, giving effect to a reasonable breadth of construction of the express language of the claims, as hereinafter set forth.

What is claimed is:

1. A device for detecting defects in metallic objects comprising, in combination, a hand search unit and a portable unit and a cable connecting the said two units, a high frequency oscillator having a coil as the primary frequency determining element in the hand search unit and circuit means in the portable unit, the said oscillator having an input grid circuit and an output plate circuit, a high frequency amplifier having the input thereof connected to the output plate circuit of the oscillator, a rectifier circuit connected to the output of the said high frequency amplifier and an integrating circuit connected from the said rectifying means to the grid input circuit of the oscillator, a low frequency amplifier connected to the said rectifier and a peak reading voltmeter means connected to the output of the said low frequency amplifier including a meter mounted in the said portable unit for directly indicating the depth of flaws detected by movement of the said hand search unit over a work piece.

2. The invention in accordance with claim 1, and including an indicating lamp in the hand search unit and an amplifier in the portable unit connected to the output of the said low frequency amplifier and to the lamp for indicating the presence of defect changes of greater than a predetermined magnitude.

3. The invention in accordance with claim 1, the said peak reading voltmeter means comprising an amplifier, an output transformer for the said amplifier, a cathode follower and a rectifier connected between the said cathode follower and the secondary of the said transformer and the said meter comprising a milliammeter in the cathode circuit of the said cathode follower, and a potentiometer in the input circuit of the said first-named amplifier for calibrating the meter to indicate flaw depths corresponding to the strength of the impulses received from the low frequency amplifier.

4. In a flaw detector, in combination, an oscillator having an input grid circuit and an output plate circuit, a high frequency amplifier having the input thereof connected to the output plate circuit of the oscillator, a rectifier circuit connected to the output of the said high frequency amplifier and an integrating circuit connected from the said rectifying means to the grid input circuit of the oscillator, a low frequency amplifier connected to the said rectifier and a peak reading voltmeter means connected to the output of the said low frequency amplifier including a meter for directly indicating the depth of flaws detected by the device.

5. The invention in accordance with claim 4, the said peak reading voltmeter means comprising an amplifier, an output transformer for the said amplifier, a cathode follower and a rectifier connected between the said cathode follower and the secondary of the said transformer and the said meter comprising a milliammeter in the cathode circuit of the said cathode follower, and a potentiometer in the input circuit of said first-named amplifier for calibrating the meter to indicate flaw depths corresponding to the strength of the impulses received from the low frequency amplifier.

6. In a flaw detector, in combination, an oscillator comprising an amplifier stage and a feedback stage, each including a vacuum tube having a grid circuit and a plate circuit, a coil adapted to be placed in proximity of a work piece, high frequency amplifying means having the input thereof connected to the plate circuit of the said amplifier stage and having an output plate circuit, rectifying means connected to the said output circuit and a circuit connected from the said rectifier to the grid circuit of the said feedback stage for applying a bias to the grid circuit, the said last-named circuit including an integrating circuit having a time constant of greater than a predetermined duration for permitting the bias of the said grid circuit to vary relatively slowly and thereby produce low frequency changes in the output of the said oscillator, a low frequency amplifier connected to the output of the said rectifier for amplifying the low frequency changes, and peak reading voltmeter means connected to the output of the said low frequency amplifier including a meter and responsive to the intensity of the low frequency changes to directly indicate the depth of flaws detected by the devices.

7. A device for detecting defects in metallic objects comprising, in combination, a hand search unit and a portable unit and a cable connecting the said two units, oscillator means including a coil in the search unit and an amplifier and feedback means in the portable unit, the input to said feedback means including rectifying means connected to the output of said amplifying means, the said feedback means including an integrating circuit having a time constant of greater than a predetermined duration connected from the output of said rectifying means to a control element on the said oscillator means, an amplifier means connected to the output of said rectifier, a milliammeter in the said portable unit and a pulse peak indicating circuit connected to the amplifier means and to the meter whereby the depth of seams detected by moving the search unit over a work piece is indicated directly on the meter in the portable unit.

References Cited in the file of this patent

UNITED STATES PATENTS

| | | |
|---|---|---|
| 2,489,920 | Michel | Nov. 29, 1949 |
| 2,660,704 | Harmon et al. | Nov. 24, 1953 |